United States Patent
Ueda

[11] 3,820,495
[45] June 28, 1974

[54] FENDER

[75] Inventor: Shigeo Ueda, Yokohama, Japan

[73] Assignee: Bridgestone Tire Company Limited, Tokyo, Japan

[22] Filed: Feb. 7, 1973

[21] Appl. No.: 330,451

[30] Foreign Application Priority Data
Feb. 10, 1972   Japan................................ 47-16273

[52] U.S. Cl.................................... 114/219, 61/48
[51] Int. Cl............................................ B63b 59/02
[58] Field of Search ........... 114/219; 61/48; 52/716, 52/717, 718; 293/1, DIG. 4; 267/39, 40

[56] References Cited
UNITED STATES PATENTS

| | | | |
|---|---|---|---|
| 1,895,647 | 1/1933 | Brown................................ | 114/219 |
| 2,910,033 | 10/1959 | Weisburg........................... | 114/219 |
| 2,935,855 | 5/1960 | Reid................................... | 114/219 X |
| 3,418,815 | 12/1968 | Kumazawa......................... | 114/219 X |
| 3,498,252 | 3/1970 | Peacock............................. | 114/219 |
| 3,638,985 | 2/1972 | Barton et al...................... | 114/219 X |

Primary Examiner—Trygve M. Blix
Assistant Examiner—Gregory W. O'Connor
Attorney, Agent, or Firm—Eric H. Waters

[57] ABSTRACT

A fender adapted to be fixedly mounted on the surface of the quay or the like for elastically engaging with the broadside of a vessel which fender comprises a body made of elastic material such as natural or synthetic rubber substantially having a bottom wall to be contacted with the broadside and opposite side walls for forming a hollow space defined thereby with the quay surface, the inner surface of said top wall having an inwardly projected rib so that when the body is extensively collapsed said rib may abut on the quay surface to support the top wall together with said opposite walls for absorbing further shock energy. Due to such construction of the fender, a considerably wide range of the shock energy can be effectively absorbed.

4 Claims, 4 Drawing Figures

FENDER

This invention relates to a fender attached to quays or the like, and more particularly to a W-shaped fender for contact by vessels and adapted to be applied to contact by various large and small vessels when the vessels are brought alongside the quay.

Generally, there is a wide difference between a shock or impact load on the fender imparted by the large vessel and that imparted by the small vessel at the time of bringing the vessels alongside the quay. Accordingly, the fender designed to be contacted by the large vessel can not be used for the small vessel since the buffer effect thereof can not be attained by reason of imparting a strong shock to said small vessel due to the reaction force of said fender. Usually, the fender should have been individually designed so as to be applicable for each of the large and small vessels by having a suitable absorbing effect for absorbing the shock energy of each vessel at the time of bringing the vessel alongside the quay.

The fender according to this invention is fixedly mounted on the surface of a structure, such as quay for resilient engaging with the broadside of a vessel, comprising a body made of elastic material and substantially having a top wall of which the outer surface is adapted for contact with the broadside and including opposite side walls forming a hollow space defined thereby together with the quay surface when fastened thereto, the inner surface of said top wall having an inwardly projecting rib extending along the length thereof so that when said elastomer body is extensively collapsed upon being contacted by the broadside, the substantial length of the rib abuts against the quay surface along the length thereof so as to support said top wall together with said side walls and to be adapted for absorbing further shock energy.

The object of this invention is to provide a new universal fender widely applicable to contact by the various large and small vessels instead of the usual type of fender which must be separately designed for corresponding applications to each of the various large and small vessels.

Other objects and advantage of this invention may be appreciated by referring to the following description, taken in conjunction with the accompanying drawings, in which.

Figure 1:
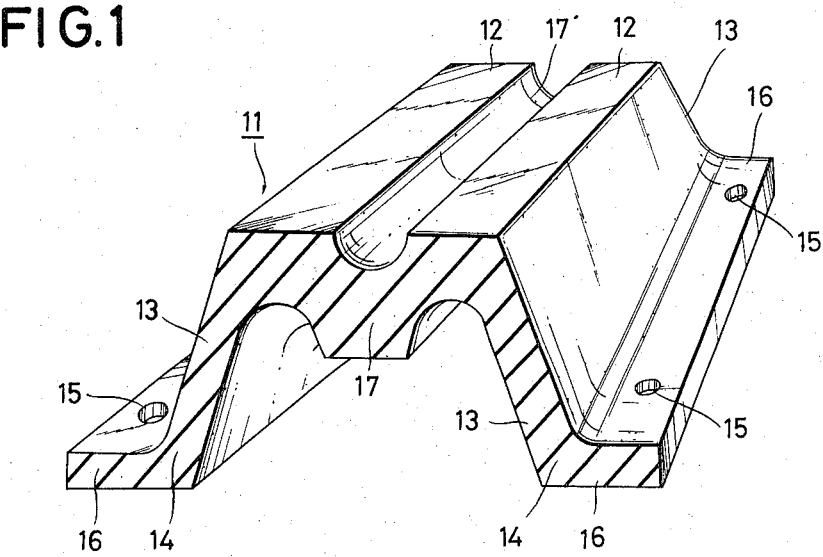
FIG. 1 is a perspective view of a W-shaped fender according to this invention.

In FIG. 1, 11 is a fender, 12 is a contact surface for engaging the broadside of a vessel, 13 is a side wall, 14 is a base end of said leg, 15 is a bore for a bolt, 16 is a flange portion, 17 is a downwardly projected portion and 17' is a fluted groove.

The fender 11 is manufactured by a shock energy absorbing material such as an elastic material which has a W-shaped cross section and consists of an integrally constructed contact surface at the top thereof, two depending side walls 13 and two fitting planar portions or flanges outwardly extended from the base end of said legs, each of which is provided with the bores 15 for a fastening bolt.

Figure 4:
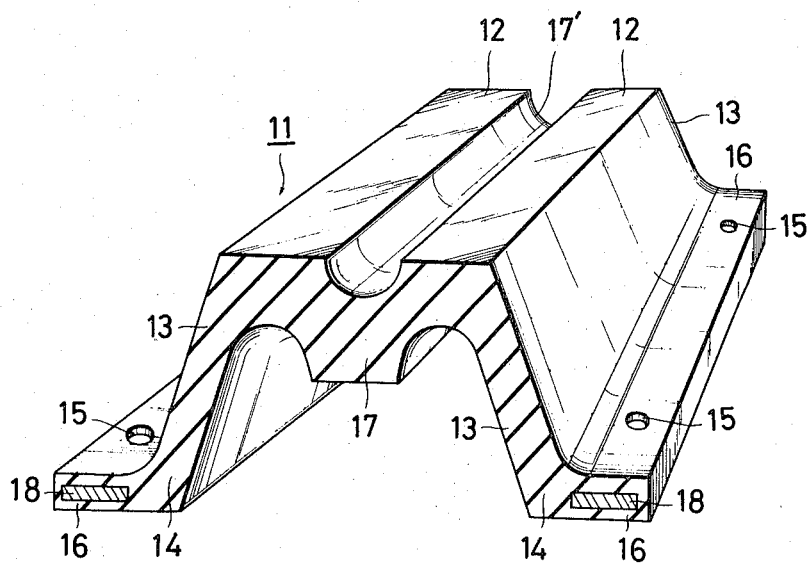
FIG. 4 is a second embodiment of a fender according to the present invention.

In order to tightly fix the fender to the quay, a rigid plate 18, as shown in FIG. 4, may preferably be embedded in the flange portion 16 or a washer may preferably be provided at the bore 15 for the bolt. The fluted groove 17' may preferably make the deformation of the fender to be uniform. Furthermore, making the contact surface 12 round may at times be preferable so as to make the shock load between the fender and vessel small. In such a case, a smaller vessel than that mentioned previously may be brought alongside the quay. In FIG. 1, the downwardly projected portion 17 has a flat surface. However, making that surface round may be preferable for avoiding the rapid rise of the shock load at the time of contact between the projected portion 17 and the structure of the quay.

As clearly mentioned herein above, the fender according to this invention has a high degree of efficiency and is widely used for bringing the vessels alongside the quay. The usual or prior art fender as shown in FIG. 3 can merely absorb the shock energy produced by the shock load correspondingly given by the shock load of the vessel by means of the deformation of the sloping legs 13'. This fact is clearly and concretely shown in part (a) of FIG. 2. If the shock load exceeding that given above is applied by the vessel, the fender can not absorb the shock energy produced, the state of which is clearly shown in part (b) of the dotted line A of FIG. 2.

Figure 2:
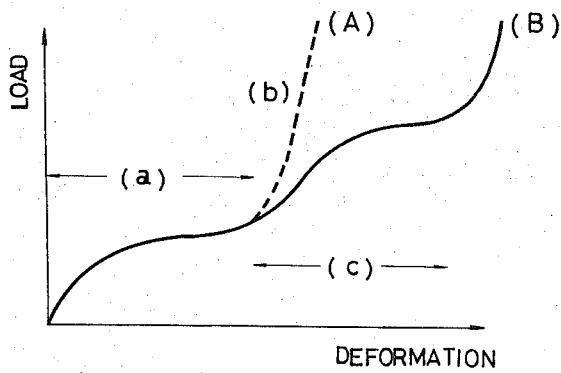
FIG. 2 is a diagram showing the relation between load and deformation when the fender is contacted by a vessel.
Figure 3:
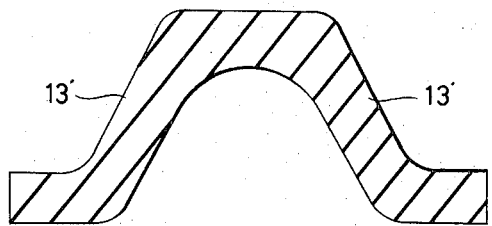
FIG. 3 is a vertical section view of a typical prior art fender.

To the contrary, when the fender according to this invention is applied for absorbing a larger shock energy than that produced in the usual fender, (1) the sloping legs 13 are first deformed as shown in part (a) of FIG. 2 and then (2) the downwardly projected portion 17 secondly touches to the structure of the quay. Thus the first absorption will be given as shown in part (a) and the second absorption shall be continuously given in the fender as shown in part (c) of line (B).

The fender according to this invention is readily applied for use with larger vessels than those adapted to be contacted with the usual fender, and may be widely and extensively applied to a large range of various large and small vessels.

What is claimed is;

1. A fender adapted to be fixedly mounted on the surface of a structure, such as a quay, for resilient engaging with the broadside of a vessel, comprising a body made of an elastic material generally having a top wall, an outer surface of the top wall adapted to be contacted by the broadside, and opposite walls depending from said top wall and having portions at the free ends thereof for fastening to said quay structure, said top wall and side walls jointly forming a hollow space together with said structure surface, the inner surface of said top wall having an inwardly projecting rib along the length thereof so that when said elastomer body is extensively collapsed upon being contacted by the broadside said rib along the length thereof abuts against the structure surface so as to support said top wall together with said side walls for absorbing further shock energy, and a fluted groove formed along the length the outer surface of said top wall being in axial alignment with said inwardly projecting rib to render said body readily deformable.

2. A fender as claimed in claim 1, in which each of said side walls is slanted outwards in the cross section toward its free end.

3. A fender as claimed in claim 1, in which each of the portions at the free ends of said side walls includes an outwardly projected flange along the length thereof, and said fender adapted to be fixedly mounted on the structure surface through said flanges.

4. A fender as claimed in claim 3, in which each of said flanges of elastic material has a metal plate embedded therein extending along the length thereof for rigid mounting.

* * * * *